Patented May 7, 1929.

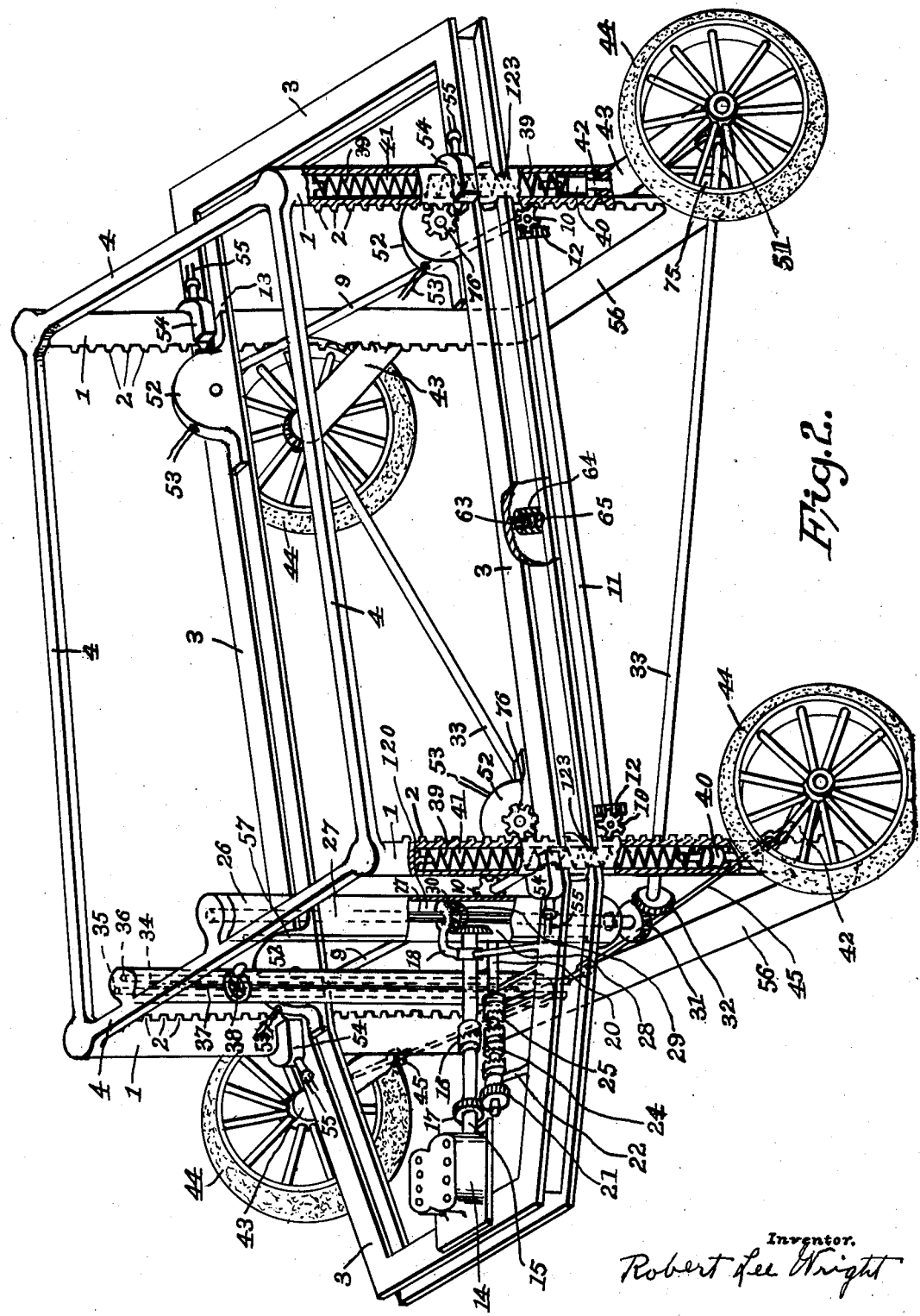

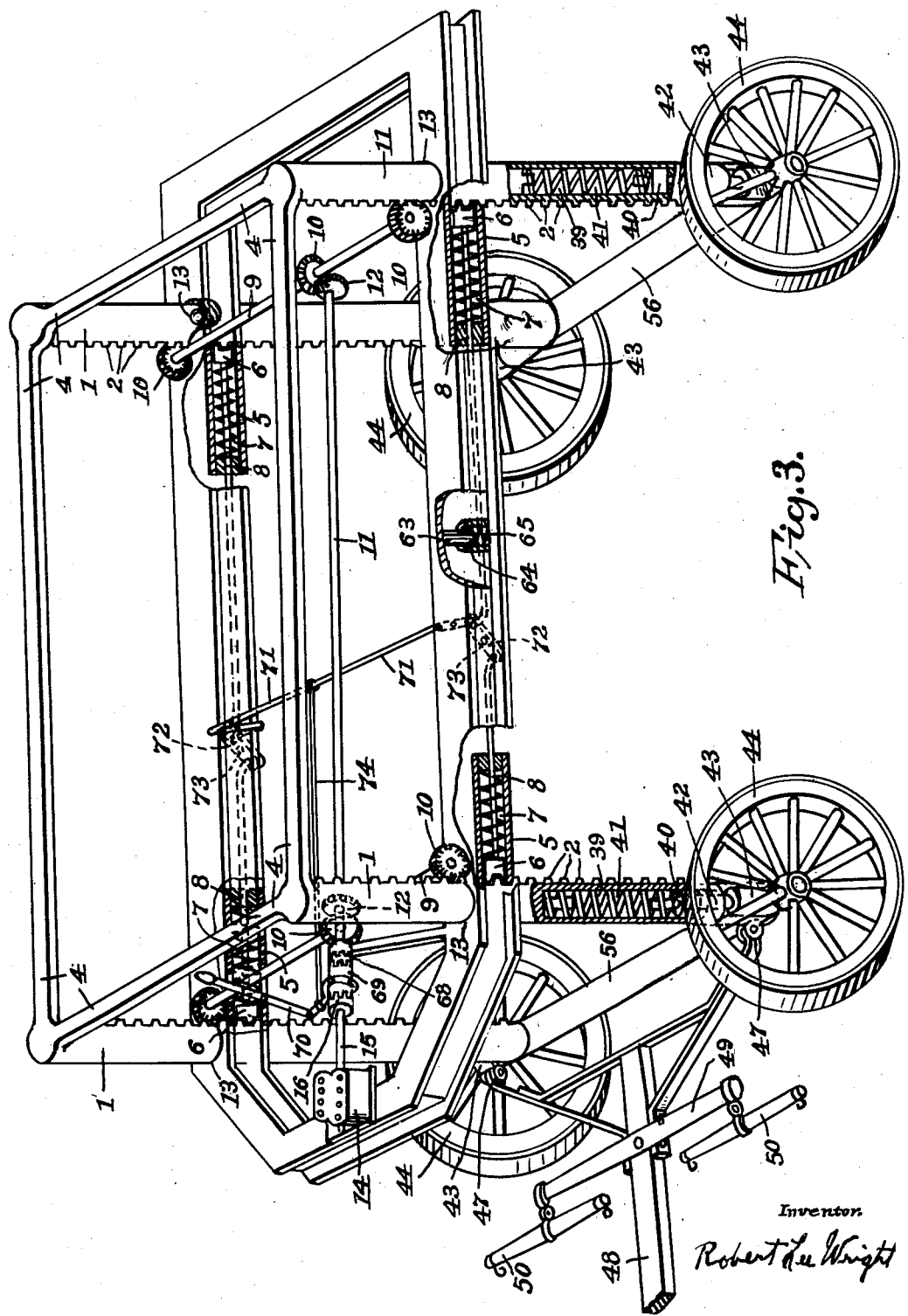

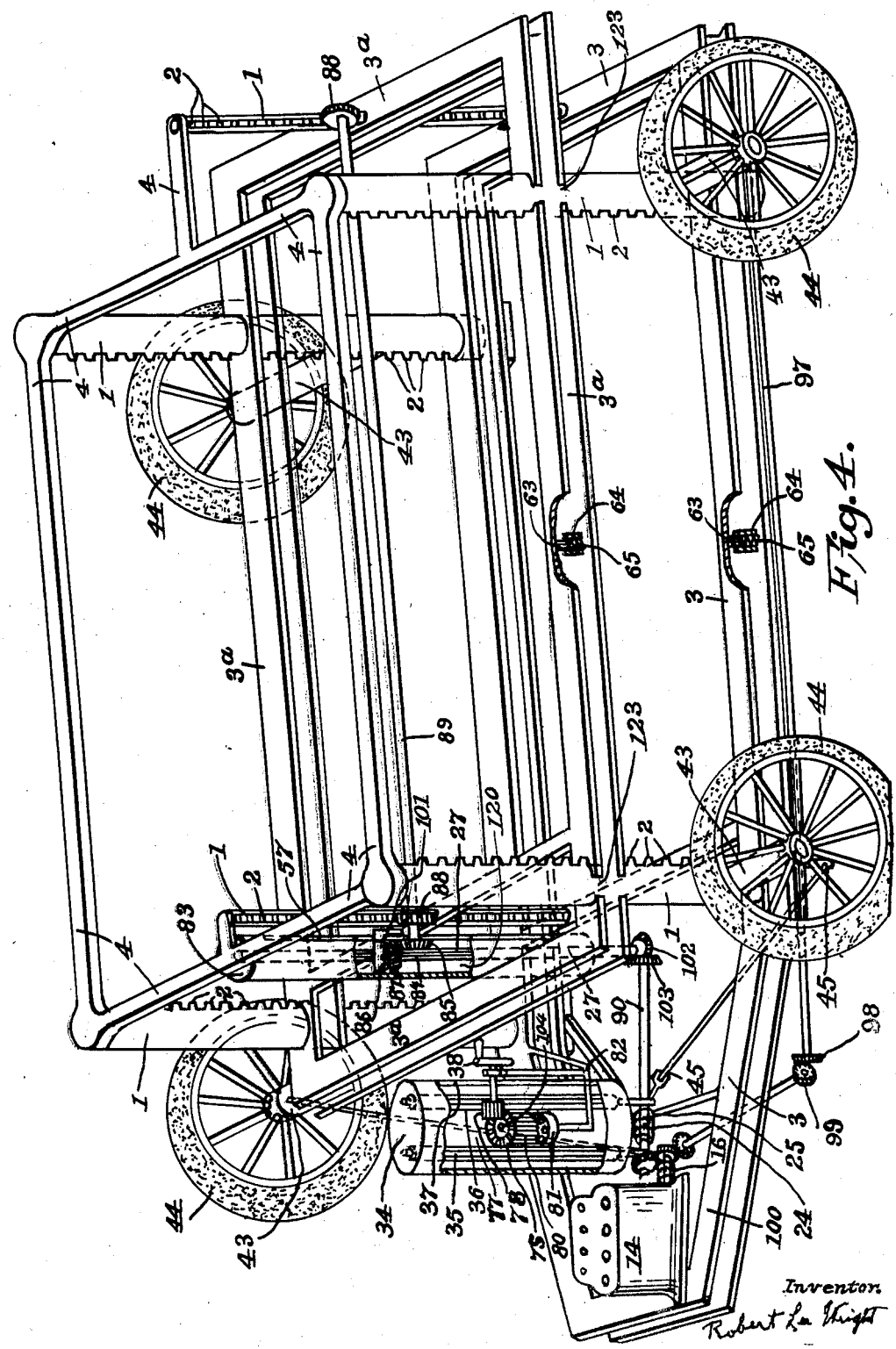

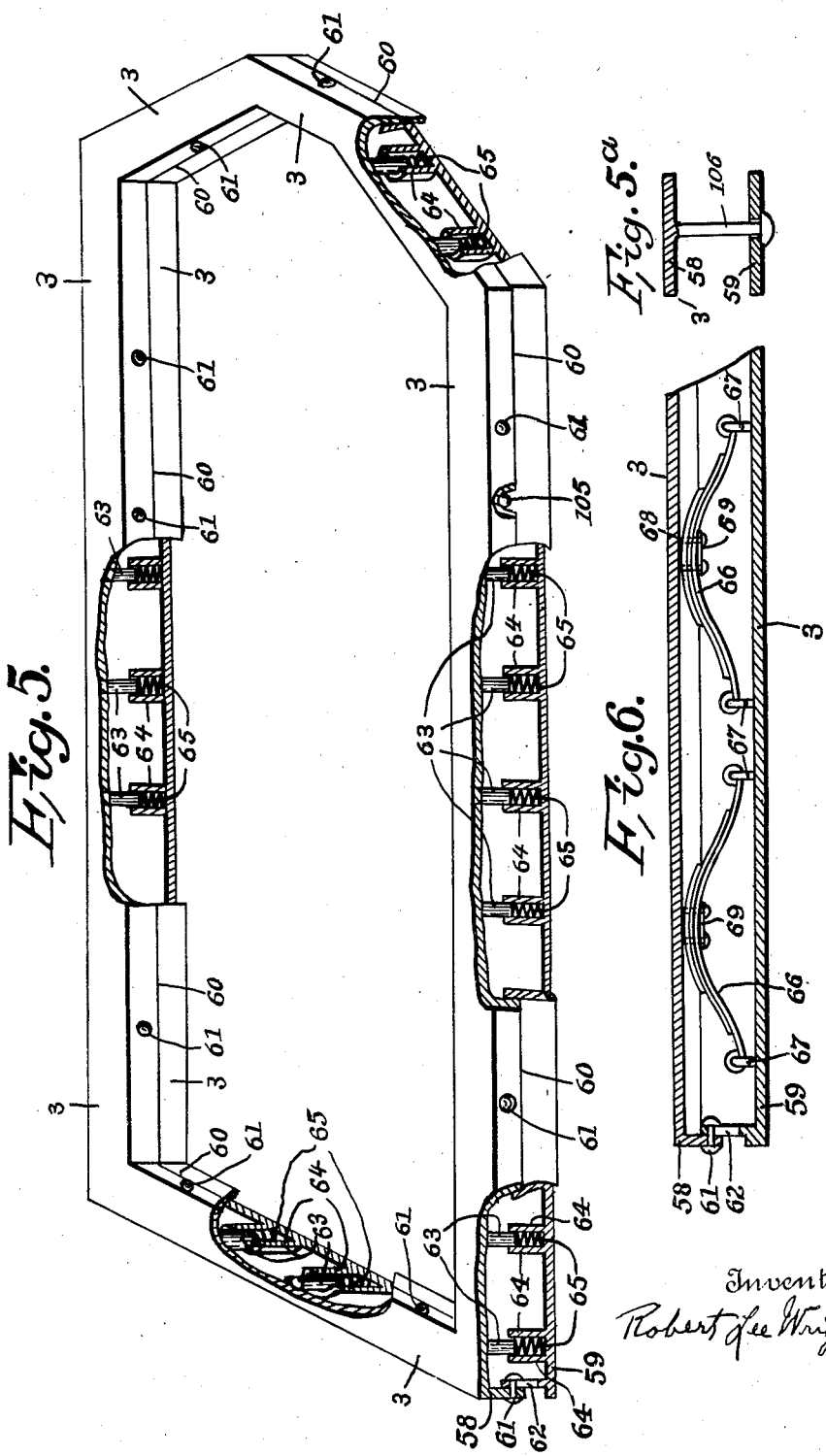

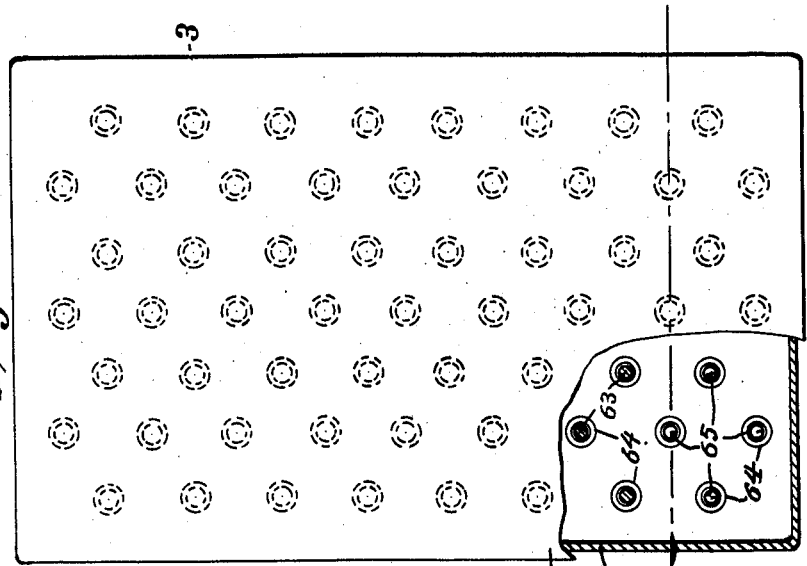
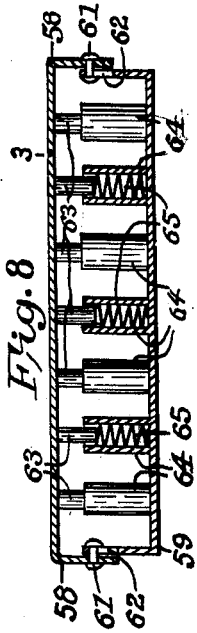
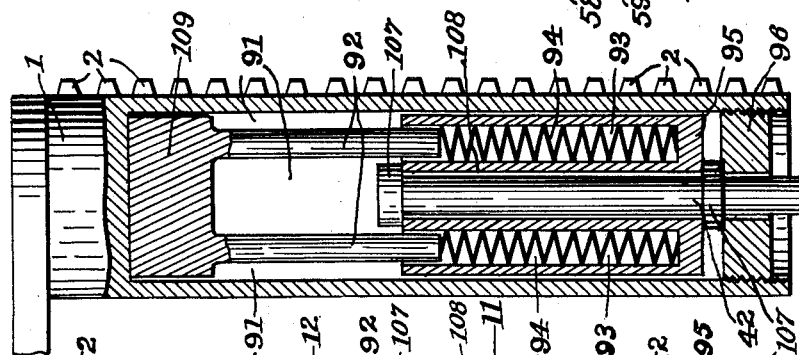
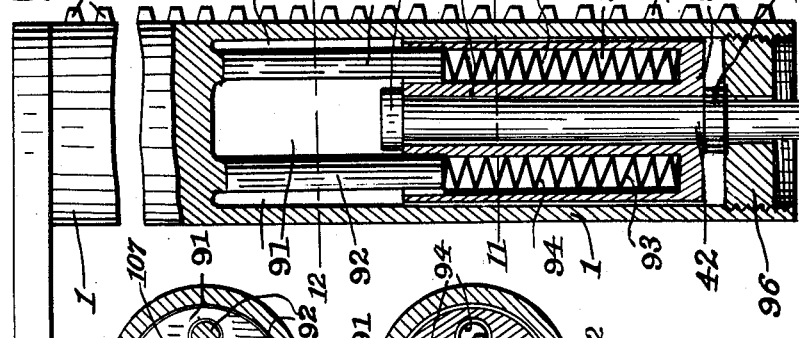
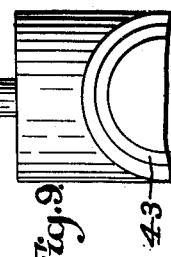
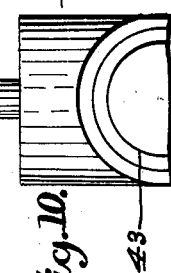

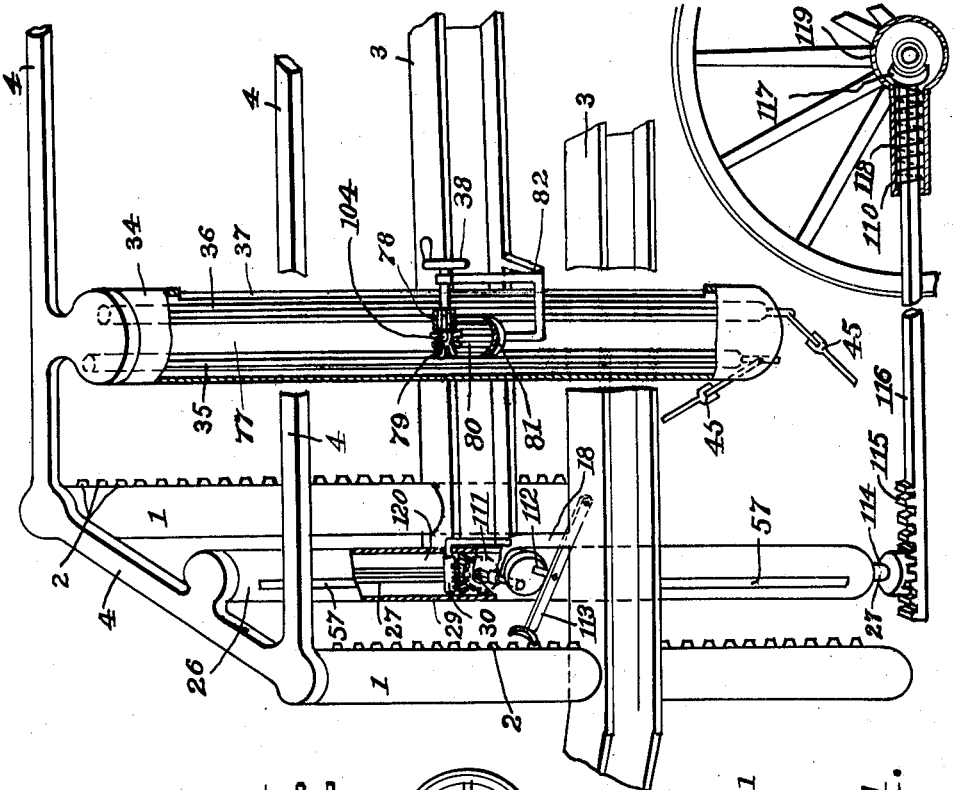

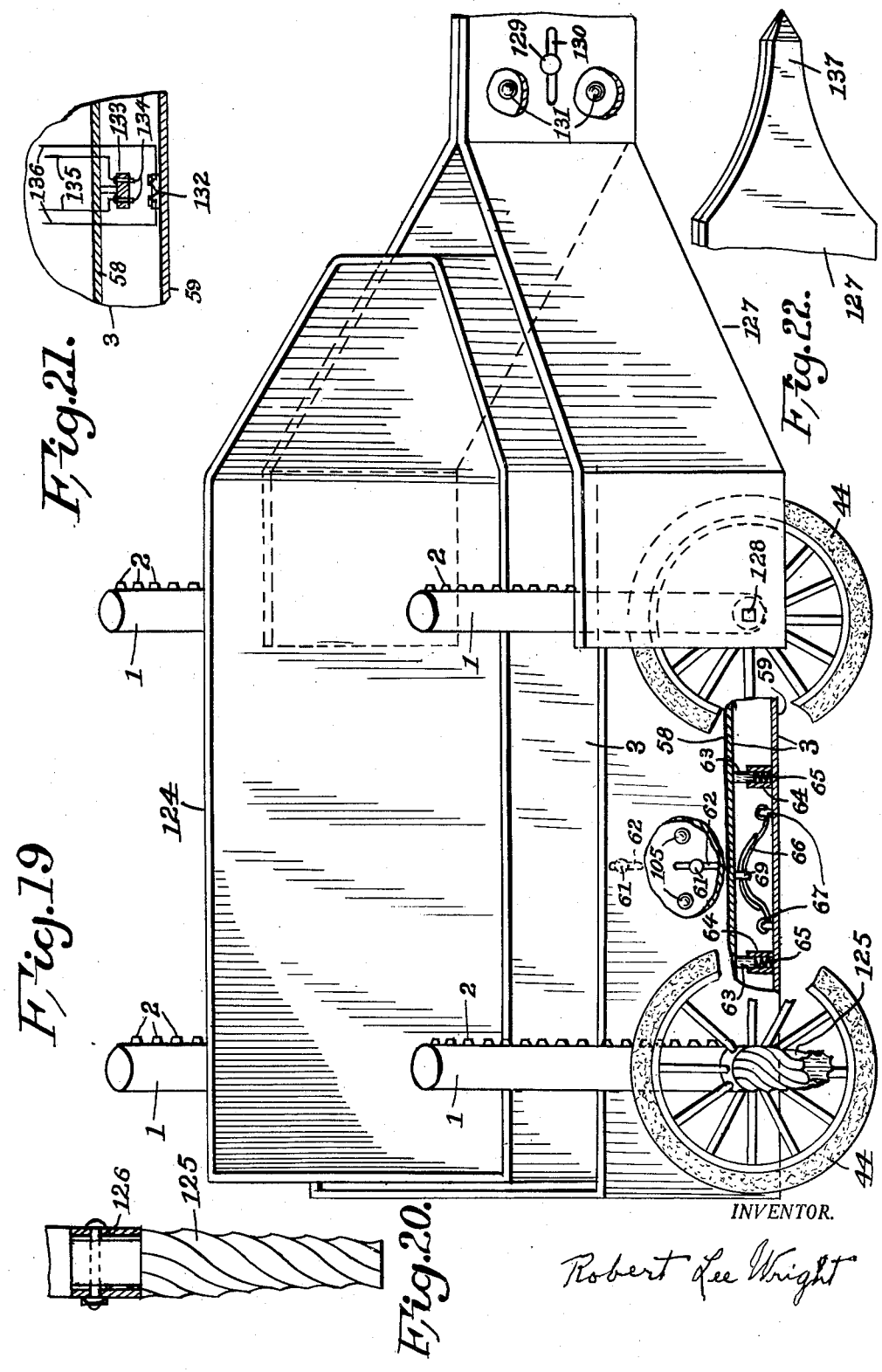

1,711,629

UNITED STATES PATENT OFFICE.

ROBERT LEE WRIGHT, OF LOS ANGELES, CALIFORNIA; WILLIE CRACKETT WRIGHT ADMINISTRATRIX OF SAID ROBERT LEE WRIGHT, DECEASED.

LAND, WATER, AND AIR VEHICLE.

Application filed December 30, 1922. Serial No. 610,036.

This invention relates to improvements in land, water and air vehicles.

The invention consists in the novel details of construction and combination of parts more fully hereinafter disclosed and particularly pointed out in the claims.

Referring to the accompanying drawings forming a part of this specification in which like numerals designate similar parts in all the views:

Figure 2 is a perspective view of a modified form of the improvement.

Figure 3 is a perspective view of another form of the improvement.

Figure 4 is a perspective view of the improvement showing a modified form of operating means.

Figure 5 is a perspective view, partly broken out, of the movable frame.

Figure 1:
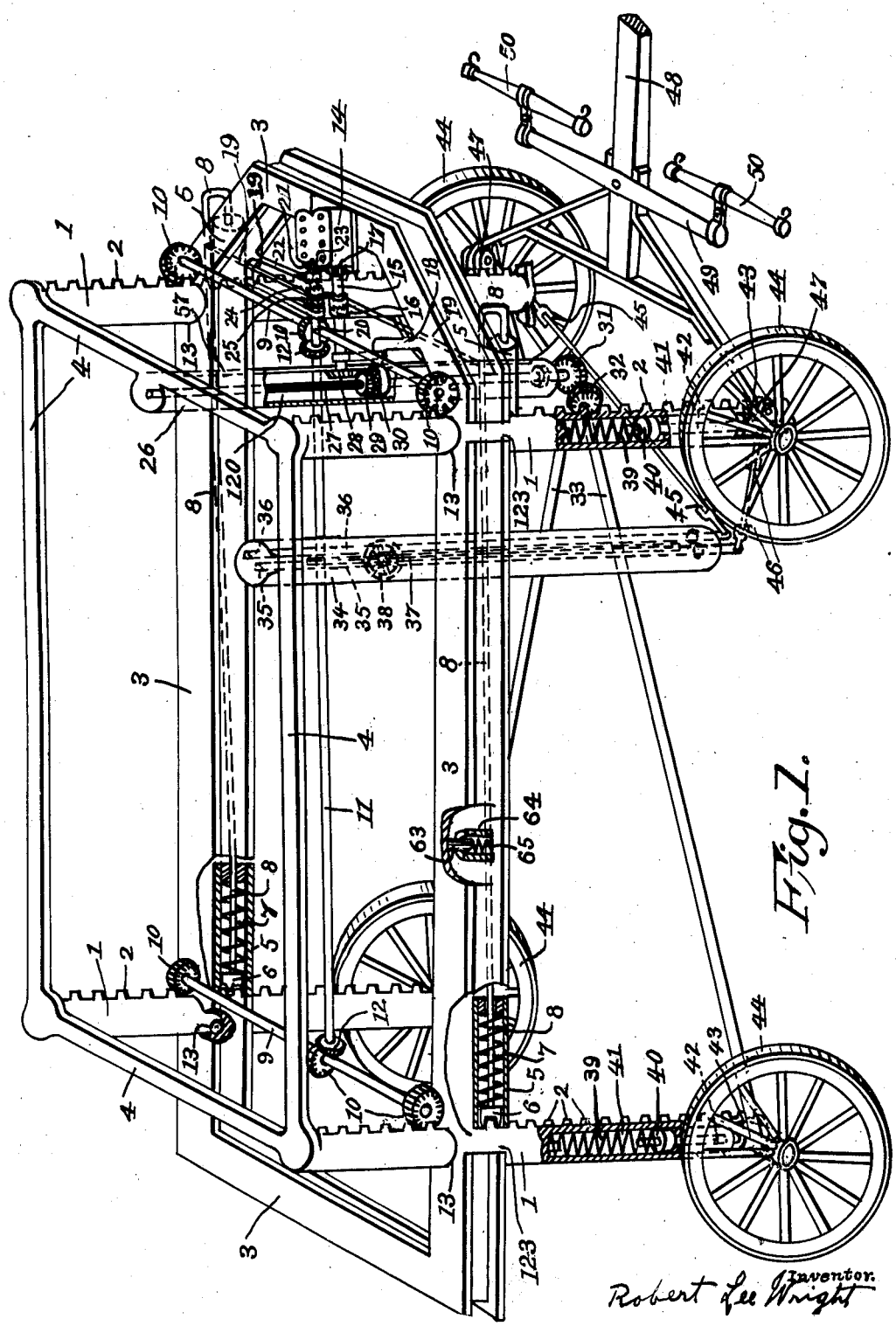
Figure 1 shows a perspective view of the invention partly in section.

Figure 5ᵃ is a sectional view showing a modified means for connecting the parts of the frame.

Figure 6 is a longitudinal section through the frame, showing a modified spring means between the parts of such frame.

Figure 7 is a plan view, partly broken out, showing a modified arrangement of the spring means for the frame.

Figure 8 is a transverse section of the form shown in Figure 7.

Figure 9 is a view in elevation, partly in section, showing a modified means for supporting the wheel axles.

Figure 10 is a similar view showing a further modification of the wheel axle mounting in the rack bar.

Figure 11 is a section on line 11—11 of Figure 10.

Figure 12 is a section on line 12—12 of Figure 10.

Figure 13 is a broken perspective view of the vehicle showing a modified arrangement of operating mechanism.

Figure 14 is a transverse sectional view of the controlling means for the steering mechanism.

Figure 15 is a broken longitudinal sectional view, partly in elevation, showing a modified form of steering operator.

Figure 16 is a broken sectional view, partly in elevation, showing a modified arrangement of the wheel axle support in the rack bar.

Figure 17 is a view in side elevation of the vehicle showing a modified operating means.

Figure 18 is a view in elevation, partly in section, of a further modification of the operating means.

Figure 19 is a perspective view of the vehicle shown more particularly for use as a water vehicle.

Figure 20 is a plan of the propeller used with such water vehicle.

Figure 21 is a view of a detail illustrating an automatic alarm mechanism used in connection with the water vehicle.

Figure 22 is a perspective view of a portion of the forward end of the water vehicle.

The improvement is directed to a self-propelled vehicle, in which the load-supporting body may be made water-tight to float in water and is adapted to have a tongue attached for draft purposes. The wheeled support or chassis may be fitted to railroad cars or adapted for the launching gear of an aeroplane. With reference more particularly to Figure 1, which is the preferred form, 1 indicates rack bars supported on wheels 44, on which a frame 3 is raised and lowered by means of pinions 10, mounted on shafts 9, engaging with the rack A, shaft 11, having a clutch connection with a motor 14, and provided with pinion wheels 12, gearing with cogs or teeth meshing with cogs or teeth on pinion wheels 10 on shaft 9. The frame 3 may be lowered and raised by rotating shaft 11, by operating the motor 14, or any other suitable means for power for rotating shaft 11. Ball bearings 13 in frame 3 operate against rack bars 1. Clutches 5 are adapted to operate on each rack bar to hold the frame 3 in position wherever it may be stopped after being raised or lowered by operating clutches 24, simultaneously or separately with clutch 16, on shaft 15, of the motor 14. The teeth gripping means of the clutches 5 with the teeth or cogs clutched in the teeth or cogs 2, on the rack bars 1, are indicated at 6. The driving springs that operate the clutches 5 are designated at 7, and 8 indicates the rods or shafts on which the gripping means of the clutches are mounted. A cross shaft or rod 19 is secured to the clutch 24 and connecting rods or shafts 8. The braces on the rack bars are indicated at 4. The steering means enclosed in a vertical and longitudinal tube or cylinder is indicated at 34. Two vertical and longitudinal shafts with longitudinal cogs or teeth on their exterior are indicated at 35 and 36. Hand wheel 38 operates a shaft having pinion wheel 78, with cogs or teeth meshing with cogs or teeth 79, on upper end of pinion wheel 80 operated on ball bearing 81 and shaft 104. Bearings secured to frame 3 that moves the operating means 38, 78, 79, 80, 81 and 104, through the open space 77 and the slot or open space 37 in the vertical and longitudinal tube or cylinder 34, simultaneously with moving the frame 3 up and down, are indicated at 82. Rods 45 turn each front wheel simultaneously when the steering means is operated by eccentric wheel 38. It will be seen that frame 3 may be raised and lowered at will simultaneously with operating the steering means when desired.

A vertical and longitudinal tube or cylinder containing driving means is indicated at 26, and a vertical and longitudinal shaft with exterior longitudinal teeth or cogs within the vertical longitudinal tube or cylinder 26, is indicated at 27. A pinion 29 as shown in Figure 14, is provided with gear teeth 29ᵃ which engage the gear 28 on the shaft 27, the pinion 29 being provided with a ball bearing 30, is indicated at 18. It will be seen that the driving means may be operated simultaneously with the raising and lowering of frame 3, or independently as desired. The longitudinal slot or opening 57 in the vertical and longitudinal cylinder or tube 26 permits the shaft or bearing 18, secured to the frame 3 and shaft 15, when operated by the motor 14 to move up and down through slot 57 and move with them operating means 28, 29 and 30, simultaneously with the raising and lowering of frame 3. Pinion wheel 31 is secured to the lower end of shaft 27 with teeth meshing with teeth on pinion wheels 32, secured to shafts 33, which operates the driving gears to turn the rear wheels 44. A pinion wheel 21 is secured to the shaft 11, with cogs or teeth meshing with cogs or teeth on pinion wheel 17, secured to shaft 15. A brace or bearing 23 for holding the forward end of the shaft 11 is secured to frame 3. Teeth 25 on bearing 23, secured to frame 3, and supporting shaft 11, act as a part of double clutch 24. To raise and lower the frame 3, the double clutch 24 is moved forward simultaneously or separately with the clutch 16 on the shaft of motor 14, and after the frame has been raised or lowered to the position desired the double clutch 24 is thrown back with its teeth clutched in the teeth in bearing 25, and prevents shaft 11 from turning and thus holds frame 3 in position wherever it may be stopped on the rack bars 1. When the double clutch 24 is moved forward it simultaneously moves the cross shaft or rod 19, which is connected at each end with shafts 8 serving to release clutches 5 from the teeth or cogs on the rack bars 1, and permit the frame 3 to be raised or lowered as desired by operating the motor as before stated, the reverse movement of the shaft 19 permitting the springs 7 to set the clutches 5 to lock the frame 3. A longitudinal bore in the vertical rack bars 1 is designated as 41 and springs secured in the longitudinal bore 41 on which the rack bars rest is indicated at 39. There is only one spring shown in each rackbar 1, but four springs 39 may be used, as shown in Figures 9, 10, 11 and 12, when desired.

Rollers or wheels 40 are operative on the upper end or upper part of vertical shafts 42 on which the lower ends of springs 39 rest in longitudinal bores 41 in vertical rack bars 1, with the lower ends of shafts 42 forming a part of axles 43, on which ground wheels 44 are mounted. The rollers or wheels 40 when desired to turn or operate on shafts 42 are prevented from moving up and down on shafts 42 by suitable collars on shafts 42, above and below the rollers or wheels 40, as shown at 107. If desired the shafts 42 may be enlarged in the same shape and at the same place on said shafts as the rollers or wheels 40 and used in place or lieu of said rollers or wheels. Both the enlarged parts of the shafts 42 and bores 41 may be made square if desired when secured to the rear axles 43 to prevent the shafts 42 from turning in the bore 41, and the same construction may if desired be used in the front wheels by utilizing rollers 95 and 109, Figure 9. The bores 41 and the springs 39 may be made any length desired or near the full length of the rack bars 1, as shown in Figure 2, and the rack bars may be made any length desired.

The pole or tongue having doubletree 49 and singletrees 50 to be used when the automobile and wagon combined is propelled or drawn by horses or animals is indicated at 48 and is designed for removable connection with the vehicle as indicated at 47.

Frame 3 is provided with springs indicated at 65. A tube with its lower end secured to the bottom of the frame in which spring 65 is encased is indicated at 64. A shaft with its upper end secured to the top of frame 3 with its lower end resting on spring 65 is indicated at 63. The frame 3 is formed with an open space between the top and bottom suitable to place any suitable number of springs between the entire bottom and top of frame 3 to permit the top of the frame to rest on springs and when used on the bottom of a steam ship the top part of frame 3 forms the inner bottom of the ship and the bottom of frame 3 forms the outer bottom of the ship with the springs between the inner bottom or top of frame 3 and the outer bottom of ship or bottom of frame 3 with the sides and ends to the bottom of frame 3 extending above the water line thus permitting the entire ship to rest on springs and in this way preventing the ship from pounding itself to pieces on the waves in rough weather. The springs absorb the shock incident to the blows of the waves, allowing the ship to set level regardless of the rough waves of water.

This frame 3 will also prevent sea sickness by preventing the steamships and all water crafts from rolling and bounding about on the waves and also prevents accidents caused by the bottom of ships breaking when they run ashore or on rock or bottom as the springs respond to the blow or shock when the bottom of frame 3 strikes the bottom or rock and thus prevents a hole from being broken in the bottom of frame 3 and the bottom of the ship or watercraft and with the electric alarm means as shown in Figures 19 and 21 hereinafter explained a bell is sounded on the ship and the location on the ship where the accident occurred is registered in order that the ship may be removed from the trouble zone. Frame 3 may be made of any suitable metal or material desired and of any shape and size.

While clutches 5 are shown to hold frame 3 in position on rack bars 1 electric clutches with or without electric motors may be used or any suitable clutch may be used. Clutches 5 may have a frame encircling the rack bars or any shaft like shown and may be used as a brake as shown in Figure 13 if desired. The rack bars 1 may be used without braces 4 when desired and the driving gears and the shafts 33 may be operated on the sides in braces secured to rack bars and in this way leave frame 3 free of the driving and steering gears by placing same attached to braces on the rack bars outside of frame 3. Side driving gears are shown in Figure 4.

Figure 2 illustrates a modified form of vehicle, constructed, however, to a considerable extent identical with the form shown in Figure 1. The parts indicated in Figure 2 by reference numerals similar to such parts in Figure 1 are identical, and need not be further described.

The gearings to drive the rear wheels of the automobile are indicated at 51 and a vertical longitudinal groove in the lower part of the rear rack bars in which the axles 43 move up and down in responding to the pressure of the springs 39 are shown at 75. It will be noted that the bores 41 and springs 39 in the rack bars 1 are much longer than the bores and springs in Figure 1.

Numeral 40 indicates a square enlarged part of shaft 42 to fit square bore 41 in the rear rack bars and may be used on any of the modified forms of construction to prevent the shaft 42 on the rear axles from turning in the bores 41 in the rear rack bars 1. The frame 3 may be elevated by independent electric motors 52 served by the conductors 52 operating pinions 76 to engage the teeth on the rack bars. Electric clutches 54 energized through conductors 55 may be used in place of the mechanical clutches 5. Where the rack bars 3 are connected by the braces 4 the motors 52 are of course to be operated simultaneously, but where, as in Figure 19 the braces are omitted, the motors may be operated independently to insure a leveling of the frame 3 without regard to the surface over which the vehicle is traveling.

Guns may be mounted on frame 3 and raised and fired and then lowered and the frame 3 may be kept level in a way to bring a plurality of guns on a level plane regardless of the condition of the terrain. The wheels 44 show automobile tires and same may be used on Figure 1 and Figure 3, instead of iron tires or solid rubber tires if desired.

Figure 3 is a further modified form wherein parts identical with like parts in Figures 1 and 2 are indicated by the same reference numerals. A bearing with clutch teeth through which shaft 11 passes is indicated at 68 and a double clutch secured to the end of shaft 11 operated by lever 70 is indicated at 69. A shaft connecting at each end with levers 72 operated on pivot pins 73 is indicated at 71 and a shaft or rod 74 has one end secured to shaft or rod 71, and the other end secured to lever 70. When the lever 70 pushes the double clutch 69 forward into the clutch teeth 16 on shaft 15 of the motor 14 it simultaneously brings the rods or shafts 71 and 74 forward and operates the levers 72, and releases the teeth 6 of the clutches 5 from the teeth or cogs on the rack bars 1, and at the same time releases the double clutch 69 from the clutch teeth in bearing 68 and permits the motor 14 to operate shaft 11 and raise and lower the frame 3, as heretofore explained. When the frame 3 is raised or lowered to the position desired, the double clutch 69 is thrown back into clutch teeth in bearing 68, by operating the lever 70, which also allows the springs 7 in the clutches 5 to drive the clutch gripping teeth or cogs 6 into the cogs or teeth 2 on the rack bars 1, and in this way holds the frame 3 in predetermined position on the rack bars 1. The power means is indicated as an internal combustion engine 14, though obviously any type of power means may be used.

Figure 4 is a further constructional form modified with respect to Figures 1, 2 and 3 in the following particulars, which while being capable of being operated in a manner similar to that of frame 3 is preferably operated through a different mechanism. 83 shows a tube or cylinder similar to that shown in Figures 1 and 2 as 26. A shaft with longitudinal teeth or cogs encircling its exterior longitudinally and vertically secured within tube or cylinder is indicated at 84. A pinion wheel 87 meshes with the teeth on shaft 84 with said pinion mounted on a ball bearing 86 carried by support 101 extending from frame 3ᵃ.

A pinion wheel secured to shaft 89 with teeth or cogs meshing with teeth or cogs on the exterior of pinion wheel 87 is indicated at 85, and a longitudinal slot 57 is formed in the cylinder or tube 83 through which the shaft 89 and support 101 may move when the frame 3ᵃ is raised and lowered and simultaneously carry with them gearings 85, 86 and 87. A pinion wheel with cogs or teeth secured to the lower end of shaft 84, meshing with cogs or teeth 103, is indicated at 102, and shaft with double clutch 24 and bearing with teeth 25 operative with teeth on double clutch is indicated at 90. In order to raise and lower the frame 3ᵃ the double clutch 24 is thrown forward, clutching the shaft of the motor 14, and rotating shaft 90 and in turn rotating longitudinal shaft 84, causing pinion 87 to rotate pinion 101 on shaft 89, thus rotating pinion 88 on shaft 89, causing pinion 88 to mesh with teeth or cogs 2 on rack bars 1, and raising and lowering the frame 3ᵃ by rotating shaft 90. It will thus be seen that the gearings 85, 86 and 87 are secured to the frame 3ᵃ with brace or bearing 101 and when frame 3ᵃ is moved up and down it moves with its bearings 85, 86 and 87 up and down in cylinder or tube 83. Driving gears on the rear wheels are indicated at 97. The cogs on shaft 97 are indicated at 98 and cross shaft with pinion wheels with cogs meshing with pinions 98 are indicated at 99 and a pinion wheel on cross shaft 99, meshing with pinion wheel on shaft 16 on motor 14 is indicated at 100. A tube or cylinder 34, containing the steering gears is shown in Figure 1. A slot in the bores of frames 3 and 3ᵃ, as shown in Figures 1, 2 and 4, to permit the frame 3, to be lowered below the short axles 43 is indicated at 123. However, frame 3 and frame 3ᵃ may be made without slots 123, like shown in Figure 3, if desired, and the rack bars 1 may be made round or any other form desired.

Figure 5 shows a modified form of frame 3 or frame 3ᵃ. The top of frame 3 is indicated at 58 and the bottom of frame 3 is indicated at 59. The sides and ends of frame 3 where the sides of the top and bottom overlap each other and operate on ball bearings 105 are indicated at 60 and bolts operating up and down through slots 62 in response to the movement of springs 65 are designed as 61. The shafts 63 have their upper ends secured to frame 3 with their lower ends resting on springs 65 operated in tubes 64, the lower ends of which tubes are secured to bottom of frame 3. It will be seen by the drawings that frame 3 has encased in a box form or space within the frame suitable springs around the entire frame upon which rest shafts or ends of shafts 63 with the upper ends of shafts 63 secured to the inner part of top of frame 3 in a way that the weight of any load or pressure bearing upon the top of frame 3 will rest on springs 65.

Figure 5ᵃ shows bolt 106 to operate up and down through hole in bottom 59 of frame 3 with the upper end of bolt 106 secured to the top 58 of frame 3. A suitable number of these bolts may be used to hold the top and bottom of frame 3 in position in lieu of the lapping sides and ends.

Figure 6 shows a modified form of spring support, wherein leaf springs 66 are secured at 68 to the top of frame 3, as at 69, and at the bottom of the frame by bolts 67.

Figure 7 shows a modified form of frame 3 in that the frame is not in skeleton form and the supporting springs are arranged throughout the whole area of the frame.

Figure 9 shows a modified form of rack bars 1, and spring supports in said rack bars. Short axle on which the wheels 44 operate is indicated at 43 with the shaft secured to axle 43 at their lower ends and extending vertically through roller 95 held in position on shaft 42 with collars 107 on shaft 42 and operating in the bore 108 in the roller 95. Bores in roller 95 are indicated at 93 and springs in bores 93 are indicated at 94 with the ends of shaft 92 resting on the springs 94. Open spaces through which the shafts 92 move up and down are indicated at 91. A plug screwthreaded that may be removed in order to remove the rollers 98 and 109 containing shafts 92 and springs 94 is indicated at 96. As shown by the numerals and section lines in Figures 10, 11 and 12 there are four shafts 92 on roller 109 operated on four springs 94 in bores 93 in roller 95. The rack bars may be made any length desired and this form of a rack bar may be used in all of the rack bars shown in all the figures when so desired and the springs, bores, rollers and shafts may be made any length desired according to the length of the rack bars, and same may be used to operate wheels of railway cars without using cross axles, and allow the wheels to operate separately in responding to curves in track.

Figure 10 shows a construction similar to Figure 9 except that in Figure 10 the shafts 92 are integral with the rack bar 1.

Figure 13 shows a part of frame 3 and rack bars 1 with braces 4 and tube or cylinder 34 containing the steering means as shown and described in Figure 1 and also shows a tube or cylinder 26 containing means to operate clutch brakes as shown. The steering means enclosed in a vertical and longitudinal tube or cylinder is indicated at 34. Two vertical and longitudinal shafts with longitudinal cogs or teeth on their exterior are indicated at 35 and 36. Eccentric wheel to operate shaft having pinion wheel 78 with cogs or teeth meshing with cogs or teeth 79 on upper end of pinion wheel 80 operated on ball bearings 81 and shaft 104 is indicated at 38. Bearings secured to frame 3 that move the operating means 38, 78, 79, 80, 81 and 104 through open space 77 and slot 37 in the vertical and longitudinal tube or cylinder 34 simultaneously with moving the frame 3 up and down are indicated at 82. The rods that turn each front wheel 44 simultaneously when the steering means is operated by the eccentric wheel 38 is indicated at 45. It will be seen that frame 3 may be raised and lowered at any and all times simultaneously with operating the steering means when desired, and frame 3 may be raised and lowered simultaneously with operating the driving means when desired. A vertical and longitudinal tube or cylinder in which the means to operate the clutch brakes 110 are moved and operated is indicated at 26. And a vertical and longitudinal shaft with longitudinal cogs or teeth encircling its exterior within the vertical longitudinal tube or cylinder 26 is indicated at 27. A pinion wheel with cogs or teeth in its bore as shown in Figure 14 is indicated at 29. And the teeth or cogs 29ª as shown in Figure 14 mesh with cogs or teeth 27 and move up and down on the shaft and cogs 27 with the gearings or pinion wheel 111 and ball bearings 30 simultaneously with the frame 3 and the brace or bearing secured to the frame 3 and supporting the driving means 28, 29 and 30 is indicated at 18. A longitudinal slot in the vertical and longitudinal tube or cylinder through which bearing 18 and shaft on eccentric wheel 112 are moved is indicated at 57. The foot brake 113 is attached to eccentric wheel 112. The eccentric wheel may be operated by hand instead of using foot brake if desired. A pinion wheel 114 is secured to lower end of shaft 27 meshing with cogs or teeth 115 on shaft 116 to operate the clutch gripping means 117. Any pinion wheel and cogs or other gearing may be used to operate the clutch brake shown. A boxing or casing forming a part of clutch brake 110 in which clutch 117 operates is indicated at 119.

Figure 14 shows a different cross sectional view of pinion wheel 29 in tube or cylinder 26 shown in Figures 1, 2, 4 and 13, 29 indicates the pinion wheel and cogs on its exterior and 121 indicates a bore through the pinion wheel. The cogs or teeth within bore 121 are indicated at 29ª. This pinion wheel 29 moves up and down on shaft 27 in cylinder or tube 26 with its cogs or teeth 29ª in bore 121 meshing with the longitudinal cogs or teeth on the exterior of shaft 27. The ball bearing support 30 is made in the form of a collar movable up and down on shaft 27 in vertical and longitudinal tube or cylinder 26. The space around shaft 27 in tube or cylinder 26 through which the gearings move up and down is indicated at 120.

Figure 15 shows a slightly modified form of steering means except that a single pinion 80 mounted on the longitudinal shaft having a steering wheel at one end is arranged to operate the longitudinal shafts 35 and 36 hereinbefore referred to.

Figure 16 shows a different form of shaft 42 in rack bars 1. The bore 41 is enlarged at upper end to permit the enlarged part or ball 107 on upper end of shaft 42 to turn as shown.

Figure 17 is a modified form of Figures 1, 2, 3 and 4, having the same numerals and is shown in my co-pending application Serial Number 186,296, filed August 15, 1917, and for this reason a further explanation of Figure 17 is not necessary.

Figure 18 is also a modified form of Figures 1, 2, 3, 4 and 17 and is fully explained in Figure 2 and the other figures by having the same numerals as shown except numeral 122 shows where the shafts 42 may be locked in position to the rack bars 1 when desired, all of which is fully shown and described in my co-pending application Serial Number 221,005 filed March 7th, 1918, and for this reason further explanation is not necessary.

Figure 19 is a further modified form showing the vehicle adapted as a water craft wherein the parts which are identical with the parts of the other forms previously described are indicated by similar reference numerals. In this form the sides and ends 124 are in appropriate outline to complete the desired form. The sides and ends of bottom 59 of frame 3 extending upward above the water line are movably secured to the sides and ends formed on the top 58 of frame 3 with bolts 61 operating up and down in vertical slots or openings 62 on ball bearings 105 in response to the movement and pressure of load on the springs 66 and 65 operating between top 58 of frame 3 and bottom 59 of frame 3. Propellers to propel the automobile and boat or water craft combined and separately secured to the outer end of the hubs of rear wheels 44 are indicated at 125. Means to steer or direct through the water the automobile and boat or water craft combined and separately is indicated at 127 same is secured to the outer end of the shafts or axles on which the front wheels 44 are operated and is indicated at 128. The forward part of the steering or directing means 127 is operated by the front wheels with the automobile steering gears heretofore shown and explained in Figure 1 and other figures. However, other steering gears may be used. The point of the steering or directing means through water or air is indicated at 137. It will be seen that this point divides the air or water as the case may be and takes the air or water pressure off the large part of the steering or directing means and also takes the air and water pressure off the large part of the automobile and boat or water craft combined or separately and allows same to go forward at a greater speed with the same driving power as the point 137, prevents the air and water pressure from coming in contact with the large part of the automobile and boat or water craft combined and separately. It will be seen that the same may be used on all steam ships and other water crafts and also on airplanes, air ships and all aircrafts, and aircrafts and water crafts combined. It will be seen by the drawings that the top of frame 3 also forms, when its sides and ends are turned upward, the bottom and sides or inner bottom and sides and ends of the automobile and boat or water craft combined and separately, and that all of the weight and pressure of the load rest upon springs 66 and 65 secured to and operating between top 58 of frame 3, and bottom 59 of frame 3. There are only a few springs shown but the entire bottom of frame 3 and the top of frame 3 is supported with springs in the same way as those shown and also shown and explained in Figures 5, 5ª, 6, 7 and 8, and also explained in Figure 1 and other figures.

Figure 20 shows a view of the propeller 125 secured to the hub of the wheel as shown at 126.

Figure 21 shows electric alarm means placed between the top 58 and the bottom 59 of the frame 3, which is explained as follows:

Electric contact plates are shown at 132 secured to bottom 59 of frame 3 and electric wires to contact plates connected with electric current bell and indicator are indicated at 136. Electric socket secured to top 58, in which electric contract pins 134 are secured, is indicated at 133, and the electric wires secured to electric contact pins 134 and connected to electric current, bell and indicator, not shown nor indicated at 135. The operation may be understood as follows: When the automobile and boat, ship or water craft combined and separately runs ashore or on a rock pressing the bottom 59 and top 58 of frame 3 together sufficient for the electric pins 134 to come in contact with the electric plates 132, it closes the electric circuit and sounds the bell and registers on the indicator the exact location of the trouble that has taken place on the bottom of the automobile, steamship, boat or water craft combined and separately. As before explained, it will be seen that the springs in frame 3 prevent accidents by the bottom of the steamship, boat or water craft being damaged and it will also prevent rough voyages and seasickness while traveling on water. The directing means 127 is directed simultaneously with the turning of the forward wheels with the steering gears shown and described in Figure 1 and in other figures. Frame 3 and the entire body may be raised and lowered with both electrical means and other means like shown in Figures 1, 2, 3, 4, 5, 6, 7, 8, 9, 10, 11, 12, 13, 14, 15, 16, 17 and 18, and when Figure 19 is used to mount guns upon the directing means 127 may extend upward a suitable distance for breastworks and may be made of steel plate and the shape shown will turn or protect the men and guns from the fire of the enemy. Any suitable means of power including electrical means may be used for propelling and operating purposes. Guns may be raised and fired and dropped down behind the steel plate 127, as shown, and, when a plurality of guns are used the wheels on shafts operating in the rack bars 1 may be raised and lowered to bring the frame and body 3 on a level plane and thus bring said plurality of guns on a level plane regardless of the condition of the terrain, and when going around a mountain side the wheels may be adjusted in order to keep the frame 3 and body and load mounted thereon on a level and thus prevent same from turning over.

Figure 22 shows a part of the point and forward end of the steering or directing means 127 broken away as shown by the drawings and having the same numeral 127. This point may be made any suitable length and shape to do the work the best. The forward part of the point is indicated at 137.

It is obvious that those skilled in the art may vary the details of the construction as well as the arrangement of parts without departing from the spirit of the invention and, therefore, I do not wish to be limited to the above disclosure except as may be required by the claims.

What I claim is:—

1. A frame with top and bottom, a space between said top and bottom of said frame, a plurality of springs placed in said space said top and bottom of said frame having sides and ends overlapping each other with ball bearings operating in sides and ends of top and bottom of said frame where sides and ends overlap each other in a way to cause said sides and ends to work up and down easily in response to the pressure or movement of said plurality of springs.

2. An automobile and wagon combined having a frame with top and bottom, a space between said top and bottom of said frame, a plurality of springs placed in said space, said top and bottom of said frame having sides and ends overlapping each other with ball-bearings operating in said sides and ends of top and bottom where said sides and ends overlap each other in a way to cause said sides and ends to work up and down on said ball-bearings in response to the load or weight placed on said frame and plurality of springs.

3. An automobile having a frame with top and bottom, a space between said top and bottom of said frame, a plurality of springs placed in said space, said top and bottom of said frame having sides and ends overlapping each other with ball-bearings operating in said sides and ends of top and bottom where said sides and ends overlap each other in a way to cause said sides and ends to work up and down on said ball-bearings in response to the load or weight placed on said frame and plurality of springs.

4. A wagon having a frame with top and bottom, a space between said top and bottom of said frame, a plurality of springs placed in said space, said top and bottom of said frame having sides and ends overlapping each other with ball-bearings operating in said sides and ends of top and bottom where said sides and ends overlap each other in a way to cause said sides and ends to work up and down on said ball-bearings in response to the load or weight placed on said frame and plurality of springs.

5. An automobile and boat or water craft combined and separately, having a frame with top and bottom, a space between said top and bottom of said frame, a plurality of springs placed in said space, said top and bottom of said frame having sides and ends overlapping each other with ball-bearings operating in said sides and ends of top and bottom where said sides and ends overlap each other in a way to cause said sides and ends to work up and down on said ball-bearings in response to the load, and weight pressure placed on said frame and plurality of springs.

6. A passenger or freight car having a frame with top and bottom, a space between said top and bottom of said frame, a plurality of springs placed in said space, said top and bottom of said frame having sides and ends overlapping each other with ball-bearings operating in said sides and ends of top and bottom where said sides and ends overlap each other in a way to cause said sides and ends to work up and down on said ball-bearings in response to the load, weight, and pressure placed on said frame and plurality of springs.

7. An auto vehicle comprising an adjustable motor-supporting body and a resilient wheeled support therefor comprising a plurality of partially bored rack bars, upright wheel-supporting shafts, having enlarged bearings within said bores, load supporting springs in the bores engaging said enlarged portions and means on said body portion engaging said rack bars for adjusting and locking the body portion.

8. A combined land and water automobile, comprising a wheeled chassis, a vertically adjustable load-supporting body provided with steering controls mounted thereon, body-adjusting means on the body whereby the body can be adjusted and the automobile steered and controlled simultaneously and separately.

9. Means to direct and steer a combined vehicle and water craft, said means comprising a vertical and longitudinal tube or cylinder having a plurality of vertical and longitudinal shafts operative within said tube or cylinder, a pinion wheel operated on shaft with the lower end of said pinion wheel resting and operating on ball-bearing support with cogs on the exterior of said pinion wheel meshing with cogs or teeth on the exterior of said longitudinal shafts, cogs or teeth formed on the top or upper end of said pinion wheel meshing with cogs or teeth on a pinion wheel secured to a shaft operated by eccentric wheel and supported with brace secured to frame or body of the craft or vehicle adapted to raise up and down through a longitudinal slot or opening in said cylinder or tube, said pinion wheel, ball-bearing support in said tube or cylinder simultaneously with the movement up and down of said frame or body.

10. A motor-driven vehicle having an underbody, a vertically adjustable motor and load supporting frame, a motor transmission mechanism comprising a slotted vertical sleeve or cylinder mounted on the underbody, a rotatable shaft mounted therein provided with longitudinally extending gear teeth a motor-driven internally toothed wheel slidable on said shaft and geared with said longitudinal teeth. A ball-bearing support for the gear carried by the adjustable frame and extending through the slot, and gear connections between the propelling means and the vertical shaft whereby the motor and driven pinion are movable with the frame and adjustable relatively to the vertical gear shaft.

11. A vehicle having a base and a vertically adjustable load supporting body, operating means therefor on the body, steering means, and a steering control comprising a vertical slotted cylinder mounted on the base, two rotatable gear shafts within the cylinder, connections between the shafts and the steering means, a pinion within the cylinder and slidably engaging the rotatable shafts, a support for the pinion projecting through the slot and carried by the adjustable body and pinion operating means also mounted on the supports whereby the steering is effected from the adjustable body.

12. A longitudinal tube or cylinder containing means to operate a clutch or clutches and brake clutches, having a longitudinal shaft with longitudinal teeth or cogs formed on its exterior, a pinion wheel having a bore through its center with cogs or teeth in said bore meshing with the cogs or teeth on the exterior of said longitudinal shaft and movable up and down on said longitudinal shaft, cogs or teeth on the exterior of said pinion wheel meshing with cogs or teeth on pinion wheel on shaft operated by eccentric wheel or other means, said first mentioned pinion wheel operating on ball-bearing support or brace secured to a frame or body of automobile and wagon combined and separately, or automobile and boat combined and separately, adapted to raise up and down through a longitudinal slot or opening in said cylinder or tube said pinion wheels and ball-bearing support in or through said tube or cylinder simultaneously with the raising and lowering of said frame or body.

13. An automobile and boat or water craft combined and separately having a frame upon which any body or load may be placed, said frame having a top and bottom with springs support between said top and bottom and electrical means secured between said top and bottom of said frame in a way to operate a bell and indicator and sound the alarm and register the part of the automobile and boat or water craft combined and separately which is overloaded or where an accident has taken place by running ashore or on a rock or other objects.

14. An automobile and boat or water craft combined and separately having a projection extending out from its forward end comprising two parts with said two parts of said projection operating backwards and forwards on ball-bearings, a slot or open space in one or each of said sides or parts of said projection and a bolt operating in said slot or open space to hold said parts or sides of said projection together and allow said sides or parts to operate backwards and forwards on ball-bearings against each other while turning said projection at an angle suitable to steer and direct said automobile and boat or water craft combined and separately the direction desired.

15. A vehicle comprising an adjustable motor-supporting body and a resilient wheeled support therefor comprising a plurality of partially bored rack bars, upright wheel-supporting shafts having enlarged bearings within said bores, load-supporting springs in the bores engaging said enlarged portions and means on said body portion engaging said rack bars for adjusting and locking the body portion.

16. A vehicle having an adjustable load supporting platform, retaining means for holding the platform in its adjusted position, a propelling motor on the platform, clutch-controlled means cooperating with said motor to elevate and lower the platform, and a common means for operating the clutch and the retaining means.

17. A vehicle having an adjustable load supporting platform, clutches for holding the platform in its adjusted position, a propelling motor on the platform, rack and gear mechanism for elevating and lowering the platform, clutch means between said motor and said mechanism, and a common means for operating the clutch means and said clutches.

18. A vehicle having an adjustable load supporting platform, rack bars on which the platform is adjusted, pinions cooperating with the rack bars for moving the platform, a motor for driving the pinions, a clutch between the motor and pinions, gripping means carried by the platform to engage with the rack bars to hold the platform in adjusted position, and means common to said clutch and said gripping means for operating said parts.

19. A vehicle having a load supporting platform, rack bars on which the platform is vertically adjustable, pinions cooperating with the teeth of the rack bars to elevate and lower the platform, holding clutches cooperating with the teeth of the rack bars to fix the platform in adjusted position, a motor on the platform for operating the pinions, a clutch between the motor and pinions, and members connecting the motor clutch and holding clutches to move the latter to release positions in the operative position of the former.

20. A vehicle having a load supporting platform, a plurality of vertical rack bars on which the platform is adjustable, means cooperating with the rack bars for moving the platform relative thereto, wheel supports, a plurality of springs confined within the rack bars and bearing between the wheel supports and rack bars to resiliently support the platform on said wheel supports.

In testimony whereof I have hereto set my hand.

ROBERT LEE WRIGHT.

CERTIFICATE OF CORRECTION.

Patent No. 1,711,629.  Granted May 7, 1929, to

ROBERT LEE WRIGHT, deceased, whose Administratrix is
WILLIE CROCKETT WRIGHT.

It is hereby certified that the name of the administratrix in the above numbered patent was eroneously written and printed as "Willie Crackett Wright", whereas said name should have been written and printed as "Willie Crockett Wright", as shown by the records of assignments in this office; and that the said Letters Patent should be read with this correction therein that the same may conform to the record of the case in the Patent Office.

Signed and sealed this 18th day of June, A. D. 1929.

(Seal)

M. J. Moore,
Acting Commissioner of Patents.